(12) United States Patent
Charbiwala et al.

(10) Patent No.: US 10,630,099 B2
(45) Date of Patent: Apr. 21, 2020

(54) REDUCING CONVERSION LOSSES AND MINIMIZING LOAD VIA APPLIANCE LEVEL DISTRIBUTED STORAGE

(71) Applicants: International Business Machines Corporation, Armonk, NY (US); Universiti Brunei Darussalam, Gadong (BN)

(72) Inventors: Zainul Charbiwala, Bangalore (IN); Sunil Ghai, Bangalore (IN); Devasenapathi P. Seetharamakrish, Bangalore (IN); Swarnalatha Mylavarapu, Bangalore (IN); Lim Chee Ming, Gadong (BN)

(73) Assignees: International Business Machines Corporation, Armonk, NY (US); Universiti Brunei Darussalam, Muara (BN)

( * ) Notice: Subject to any disclaimer, the term of this patent is extended or adjusted under 35 U.S.C. 154(b) by 210 days.

(21) Appl. No.: 13/914,911

(22) Filed: Jun. 11, 2013

(65) Prior Publication Data

US 2014/0361748 A1    Dec. 11, 2014

(51) Int. Cl.
*H02J 3/14*    (2006.01)
*H02J 3/34*    (2006.01)
(Continued)

(52) U.S. Cl.
CPC ............ *H02J 7/34* (2013.01); *B60L 11/1842* (2013.01); *H02J 3/14* (2013.01); *H02J 3/34* (2013.01);
(Continued)

(58) Field of Classification Search
CPC ......... H02J 7/041; H02J 7/0442; H02J 7/0073
See application file for complete search history.

(56) References Cited

U.S. PATENT DOCUMENTS 206,108 A     7/1878  Hill
4,400,624 A *  8/1983  Ebert, Jr. .................. 307/43
(Continued)

FOREIGN PATENT DOCUMENTS

CN    202602284 U    12/2012
EP    2385352 A2    11/2011
(Continued)

OTHER PUBLICATIONS ip.com, Method to Regulate Ac Power to Device that has Battery Power Capabilities, IPCOM000182770D Publication Date: May 5, 2009.
(Continued)

*Primary Examiner* — David V Henze-Gongola
*Assistant Examiner* — Tarikh Kanem Rankine
(74) *Attorney, Agent, or Firm* — Ryan, Mason & Lewis, LLP

(57) ABSTRACT

Techniques, systems, and articles of manufacture for reducing conversion losses and minimizing load via appliance level distributed storage. A method includes identifying an alternating current power source associated with a direct current-powered device, determining a storage scheme for storing direct current power, converted from alternating current power input from the identified alternating current power source, in a local storage component associated with the direct current-powered device, and managing output of direct current power to the direct current-powered device based on the storage scheme and the identified alternating current power source.

15 Claims, 5 Drawing Sheets

(51) Int. Cl.
  H02J 3/38    (2006.01)
  H02J 7/34    (2006.01)
  H02J 9/06    (2006.01)
  B60L 11/18   (2006.01)
(52) U.S. Cl.
  CPC .............. *H02J 3/383* (2013.01); *H02J 9/062* (2013.01); *Y02E 10/563* (2013.01); *Y02T 90/128* (2013.01)

(56) References Cited

U.S. PATENT DOCUMENTS

| | | | |
|---|---|---|---|
| 6,459,175 B1* | 10/2002 | Potega | 307/149 |
| 6,583,521 B1* | 6/2003 | Lagod | H02J 3/005 307/29 |
| 7,191,077 B2 | 3/2007 | Mese et al. | |
| 7,570,015 B2 | 8/2009 | Bansal et al. | |
| 7,612,466 B2 | 11/2009 | Skutt | |
| 7,696,721 B2 | 4/2010 | Young | |
| 7,991,588 B1* | 8/2011 | Krieger | G06F 1/26 702/186 |
| 8,049,366 B2 | 11/2011 | Shyu et al. | |
| 2004/0169421 A1* | 9/2004 | Eaton | H02J 9/06 307/64 |
| 2006/0158037 A1* | 7/2006 | Danley | H02J 3/32 307/64 |
| 2007/0073420 A1* | 3/2007 | Lanni | 700/22 |
| 2008/0086652 A1* | 4/2008 | Krieger | G06F 1/26 713/330 |
| 2008/0180087 A1* | 7/2008 | Pankau | H02H 3/253 324/76.74 |
| 2009/0262562 A1* | 10/2009 | Yang | 363/84 |
| 2010/0017045 A1* | 1/2010 | Nesler | B60L 11/1824 700/296 |
| 2010/0060258 A1* | 3/2010 | Aisa et al. | 324/76.39 |
| 2010/0259931 A1* | 10/2010 | Chemel | F21S 8/08 362/249.02 |
| 2010/0264739 A1* | 10/2010 | Errington | 307/80 |
| 2010/0312430 A1* | 12/2010 | Troncoso | B60R 16/03 701/31.4 |
| 2011/0064445 A1 | 3/2011 | Yashiro | |
| 2011/0106328 A1* | 5/2011 | Zhou | G05B 13/024 700/291 |
| 2011/0245987 A1* | 10/2011 | Pratt | H01M 10/44 700/295 |
| 2012/0059527 A1 | 3/2012 | Beaston et al. | |
| 2012/0265355 A1* | 10/2012 | Bernheim | G05B 15/02 700/286 |
| 2013/0176000 A1* | 7/2013 | Bishop | H02J 7/0052 320/149 |

FOREIGN PATENT DOCUMENTS

| | | |
|---|---|---|
| EP | 2475068 A1 | 7/2012 |
| WO | 2006078441 A2 | 7/2006 |
| WO | 2009100295 A2 | 8/2009 |
| WO | 2009133494 A1 | 11/2009 |
| WO | 2012108987 A2 | 8/2012 |

OTHER PUBLICATIONS

Bongju et al. Modeling of Electronic Appliance Usage Pattern and Implementation of User Centric Flexible Energy Management System Applying Adaptive Energy Saving Policy, Wireless Information Technology and Systems (ICWITS), 2012 IEEE International Conference on.

Paramashivan et al. Grid-Connected Versus Stand-Alone Energy Systems for Decentralized Power—A Review of Literature. Renewable and Sustainable Energy Reviews vol. 13, Issue 8, Oct. 2009, pp. 2041-2050.

ip.com, Method to Predict Power Load Requirements Using Smart Appliances, IPCOM00186395D Publication Date: Aug. 18, 2009.

IP.COm, Time and Data Aware Standby Power Savings for Consumer Applications, IPCOM000181513D Publication Date: Apr. 3, 2009.

Hild et al. Smart Charging Technologies for Portable Electronic Devices, http://arxiv.org/abs/1209.5931) Journal of Latex Class Files, Mar. 23, 2013.

Murthy et al. Energy-agile Laptops; Demand Response of Mobile Plug Loads Using Sensor/Actuator Networks, IEEE SmartGridComm 2012, http://www.cs.berkeley.edu/~taneja/publications/murthy12laptops.pdf)

Emerge Alliance Standards, www.emergealliance.org/Standards/DataTelecom/StandardsFAQs.aspx, 2013.

Alanne et al. Distributed Energy Generation and Sustainable Development, Renewable and Sustainable Energy Reviews 10, 6 (2006), 539-558.

Baum et al. A Maximization Technique Occurring in the Statistical Analysis of Probabilistic Functions of Markov Chains, the Annals of Mathematical Statistics 41, 1 (1970), 164-171.

Boroyevich et al. Future Electronic Power Distribution Systems a Contemplative View, in Optimization of Electrical and Electronic Equipment (OPTIM), 2010 12th International Conference on (2010), IEEE, pp. 1369-1380.

Carlsson et al. Powering the Internet-Broadband Equipment in all Facilities—The Need for a 300 V DC Powering and Universal Current Option, in Telecommunications Energy Conference, 2003. INTELEC'03, the 25th International (2003), IEEE, pp. 164-169.

Ellis et al. Gadgets and Gigawatts: Policies for Energy Efficient Electronics, OECD/IEA, 2009.

Fairley, DC versus AC: the Second War on Currents has Already Begun [in my view], Power and Energy Magazine, IEEE 10, 6 (2012), 104-103.

Ganu et al. Nplug: a Smart Plug for Alleviating Peak Loads, in Future Energy Systems: Where Energy, Computing and Communication Meet (e-Energy), 2012 Third International Conference on (2012), IEEE, pp. 1-10.

Garbesi et al. Catalog of DC Appliances and Power Systems, May 18, 2012.

Hawley et al. Trends in Energy Efficiency Regulations and Initiatives for Consumer External Power Supplies, in Sustainable Systems and Technology (ISSST), 2010 IEEE International Symposium on (2010), IEEE, pp. 1-6.

Hirose, DC Power Demonstrations in Japan, in Power Electronics and ECCE Asia (ICPE & ECCE), 2011 IEEE 8th International Conference on (2011), IEEE, pp. 242-247.

Business Wire, Remote Microgrids will Help Meet Soaring Energy Demand in the Developing World, According to Pike Research, www.businesswire.com/news/home/20120613005316/en/Remote-Microgrids-Meet-Soaring-Energy-Demand-Developing Jun. 13, 2012.

Johnston et al. Beyond Power over Ethernet: The Development of Digital Energy Networks for Buildings, CIBSE Technical Symposium, Imperial University, London—Apr. 18 and 19, 2012, pp. 1-21.

Kakigano et al. Configuration and Control of a DC Microgrid for Residential Houses, in Transmission & Distribution Conference & Exposition: Asia and Pacific, 2009, IEEE, pp. 1-4.

Kakigano et al. Fundamental Characteristics of DC Microgrid for Residential Houses with Cogeneration System in Each House, in Power and Energy Society General Meeting—Conversion and Delivery of Electrical Energy in the 21st Century, 2008 IEEE (Jul. 2008) pp. 1-8.

Kinn, M. Proposed Components for the Design of a Smart Nano-Grid for a Domestic Electrical System that Operates at Below 50v DC. In Innovative Smart Grid Technologies (ISGT Europe), 2011 2nd IEEE PES International Conference and Exhibition on (2011), IEEE, pp. 1-7.

Lasseter et al. The Certs Microgrid Concept, White Paper for Transmission Reliability Program, Office of Power Technologies, US Department of Energy (2002).

Marnay, C. Future Roles of Milli-, Micro-, and Nano-grids, Symposium, Bologna, Italy, Sep. 13-15, 2011.

Mishra et al. Smartchange: Cutting the Electricity Bill in Smart Homes with Energy Storage, in Proceedings of the 3rd International

(56) References Cited

OTHER PUBLICATIONS

Conference on Future Energy Systems: Where Energy, Computing and Communication Meet (New York, USA, 2012), e-Energy'12, ACM, pp. 29:1-29:10.

Nordman, Nanogrids, Evolving our Electricity Systems from the Bottom Up, Lawrence Berkeley National Laboratory, Jan. 25, 2011.

Pratt et al. Evaluation of 400v DC Distribution in Telco and Data Centers to Improve Energy Efficiency, in Telecommunications Energy Conference, 2007, INTELEC 2007, 29th International (2007), IEEE, pp. 32-39.

Rasmussen et al. A Quantitative Comparison of High Efficiency AC vs. DC Power Distribution for Data Centers, White Paper # 127 of APC Inc. (2007).

Salomonsson et al. Low-Voltage DC Distribution System for Commercial Power Systems with Sensitive Electronic Loads, Power Delivery, IEEE Transactions on 22, 3 (Jul. 2007), 1620-1627.

Savage et al. DC Microgrids: Benefits and Barriers, Published for Renewable Energy and International Law (REIL) Project, Yale School of Forestry and Environmental Studies (2010), 0-9.

Symanski et al. 380VDC Data Center at Duke Energy, Emerging Technology Summit, Nov. 9, 2010.

Walker et al. Cascaded DC-DC Converter Connection of Photovoltaic Modules, Power Electronics, IEEE Transactions on 19, 4 (2004), 1130-1139).

Wang et al. Security Framework for Wireless Communications in Smart Distribution Grid, Smart Grid, IEEE Transactions on 2, 4 (2011), 809-818.

Zhou et al. A Composite Energy Storage System Involving Battery and Ultracapacitor with Dynamic Energy Management in Microgrid Applications, Power Electronics, IEEE Transactions on 26, 3 (2011), 923-930.

* cited by examiner

REDUCING CONVERSION LOSSES AND MINIMIZING LOAD VIA APPLIANCE LEVEL DISTRIBUTED STORAGE

FIELD OF THE INVENTION

Embodiments of the invention generally relate to information technology, and, more particularly, to energy storage and management.

BACKGROUND

Consumer electronics and appliances are designed for implementation within contexts where a power supply is reliable and available. Most such devices operate on direct current (DC), but because of the prevalence of existing alternating current (AC) infrastructure, such devices are commonly exposed to an AC input and are required to convert AC voltage to DC internally. Accordingly, in some situations, inverters with central DC batteries are installed in structures (residential homes, for example) to run a limited set of loads during power cuts and/or power outages. Similarly, some structures (commercial buildings, for example) deploy large-scale diesel generators to power the entire structure (plug loads, lighting, space cooling, etc.).

However, existing energy management approaches include energy losses while running DC appliances on a central storage component due to conversions, and such approaches can additionally require significant financial resources. Accordingly, a need exists for a mechanism to reduce conversion losses, as well as to minimize load on the local generator and/or storage unit during power cuts or outages. Additionally, a need exists for a mechanism to reduce capital expenditure costs for generator and inverter deployment tied to reduced capacity requirements.

SUMMARY

In one aspect of the present invention, techniques for reducing conversion losses and minimizing load via appliance level distributed storage are provided. An exemplary computer-implemented method can include steps of identifying an alternating current power source associated with a direct current-powered device, determining a storage scheme for storing direct current power, converted from alternating current power input from the identified alternating current power source, in a local storage component associated with the direct current-powered device, and managing output of direct current power to the direct current-powered device based on the storage scheme and the identified alternating current power source.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes reducing conversion losses and minimizing load via appliance level distributed storage. At least one embodiment of the invention includes implementing an intelligent and self-adaptive mechanism based on the use of grid signals (frequency and voltage) that schedules battery charging to minimize load on the power source(s) while respecting customer preferences in a decentralized manner to minimize computation and communication resources. For instance, an example embodiment of the invention includes providing a system between a DC-powered device and an AC power supply, wherein said system senses and determines the AC power source (the main grid, a generator, an inverter, etc.) in real-time at an appliance level, learns power availability patterns (such as usual timing of power cuts, etc.), and implements a smart battery charging approach to minimize load on local power sources and increase device availability for a user.

In accordance with at least one embodiment of the invention, adding and managing energy storage locally at each DC appliance leads to higher efficiency and lower average cost. As used herein, such a topology is referred to as a DC picogrid. Additionally, in at least one embodiment of the invention, a picogrid controller component carries out the function of identifying the power source as well as deciding on battery charging or discharging based on the power source. Also, at least one embodiment of the invention can be implemented independent of battery chemistry.

Further, in accordance with one or more aspects of the invention, DC picogrids are capable of co-existing with AC uninterrupted power supplies (UPSs) without the DC picogrid drawing power from the UPS's battery. Rather, the DC picogrid can charge from the macro-grid when available. Also, as further detailed herein, in at least one embodiment of the invention, a DC picogrid controller uses a Hidden Markov Model (HMM) for state estimation that uses temporally-correlated fluctuations in line voltage and frequency for discrimination.

Figure 1:
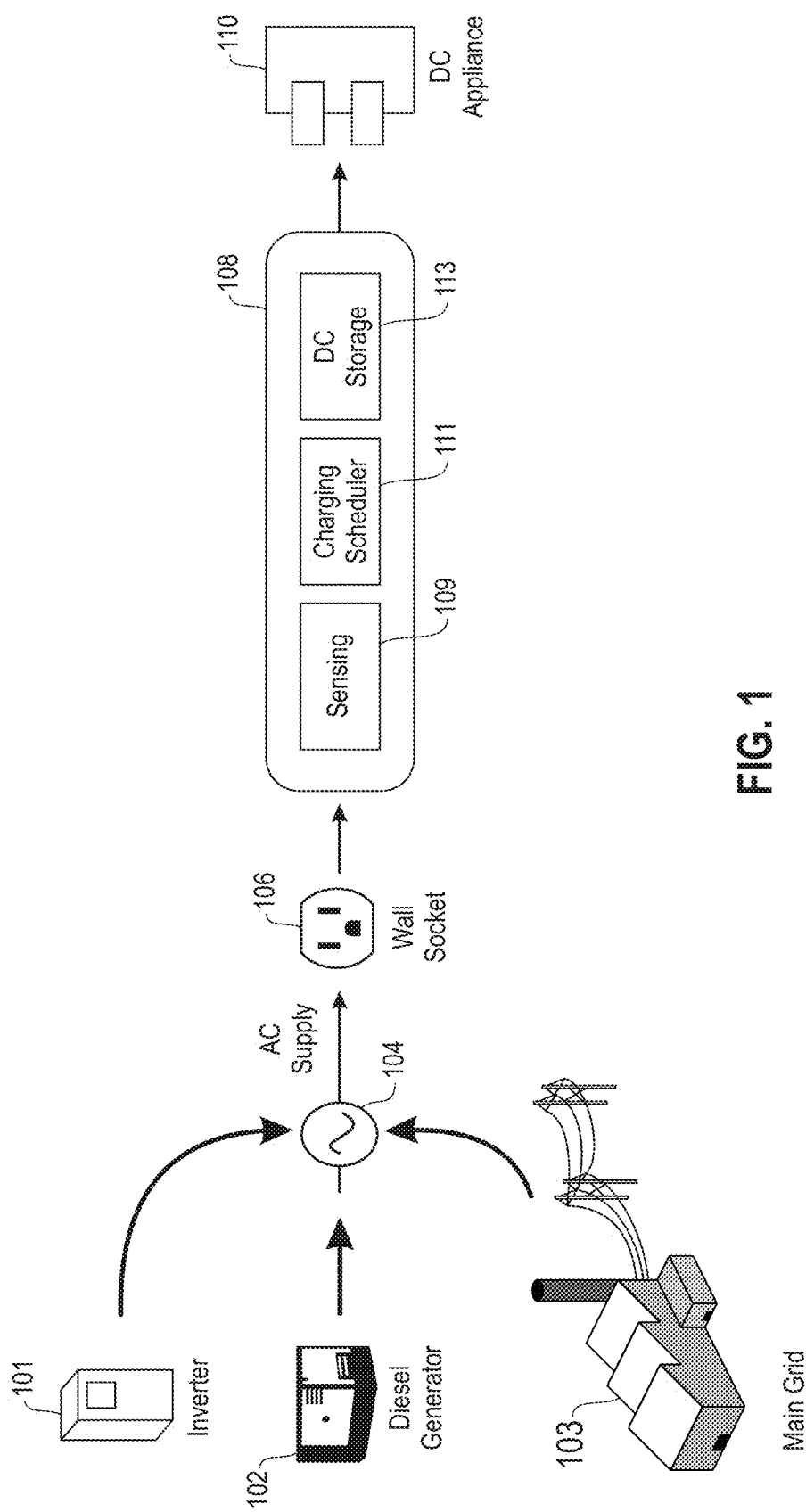
FIG. 1 is a diagram illustrating an example embodiment of the invention.

FIG. 1 is a diagram illustrating an example embodiment of the invention. By way of illustration, FIG. 1 depicts AC power sources including a main grid 103, a diesel generator 102, and an inverter 101, which provide an AC power supply 104 to a DC picogrid controller 108, for example, via a wall socket 106. As also depicted in FIG. 1, the DC picogrid controller module 108 includes a sensing component 109, a charging scheduler/manager component 111, and a local DC storage component 113. By way of illustration, the controller 108 takes an AC supply input 104, provides a DC output to a DC appliance 110, and mediates between the AC supply 104 and DC appliance 110 as further described herein.

The controller module 108 senses line voltage and frequency at regular intervals via sensing component 109 to determine the AC power source in real-time. In at least one embodiment of the invention, time intervals are pre-set based on the frequency with which the alternating current power source changes. Frequency and voltage exhibit continuous fluctuations in unstable grids where there is a high mismatch between generation and demand. In contrast, the output frequency band in local household inverters is not strongly tied to connected load or demand variations. Similarly, local generators do not demonstrate significant change in the sensed parameters. Considering that the parameters are widely dispersed in a grid as compared to a local source, at least one embodiment of the invention includes evaluating maximum likelihood based algorithms to estimate the AC power source. Moreover, in areas that periodically suffer from shortages of electricity, utility companies can resort to load shedding whereby power cuts occur sporadically throughout the day. To capture temporal patterns of such outages, at least one embodiment of the invention includes applying statistical tools, such as an HMM, to model time series data.

In an example embodiment of the invention, an employed HMM contains two hidden states, one for direct grid connectivity and a second for a backup source that turns on during an outage. Samples of frequency and voltage sensed, for example, at the input of the DC picogrid's battery charger, can be observed via the HMM to infer the state of the supply source.

By way of illustration, assume that time is discretized in $\Delta$ increments, such that $t=\Delta k$. The state is denoted by $s(k)=\{S_0, S_1, \ldots, S_N\}$ $\forall k \in \{1 \ldots n\}$, where N is the number of states and n is the sequence length. The observations are the sensed frequency $f(k)$ and voltage $v(k)$, and the voltage observations are discretized into $m_v$ equi-spaced bins between $v_{min}$ and $v_{max}$, while the frequency observations are discretized into $m_f$ equi-spaced bins between $f_{min}$ and $f_{max}$. In such an example embodiment, two independent two-state HMMs are used, one for frequency and a second for voltage, and the outputs are combined to generate a final inference.

Additionally, at least one embodiment of the invention includes implementation of a transition probability matrix A, observation symbols V and F, an emission matrix $B^v$ for voltage observations, an emission matrix $B^f$ for frequency observations, and an initial state probability matrix $\pi$. For example, a transition probability matrix includes the following:

$$A = \{a_{ij}\} \forall i,j \in \{1, 2\}$$
$$a_{ij} = Pr[s(k+1) = S_j | s(k) = S_i]$$
$$a_{ij} \geq 0$$
$$\sum_j a_{ij} = 1$$

where:
$a_{ij}$ is the probability that system transitions from state $S_i$ to state $S_j$;

i and j are variables representing state number from 0 to N;

k represents the $k^{th}$ time slot in a sequence of n time slots; and s(k) represents system state on the $k^{th}$ time slot.

Additionally, observation symbols can include the following:

$$V = \{v_1, v_2, \ldots, v_{m_v}\}$$

$$F = \{f_1, f_2, \ldots, f_{m_f}\}$$

where V and F are voltage and frequency observation symbols sets, respectively.

An emission matrix for voltage observations can include the following:

$$B^v = \{b_j^v(l)\} \forall j \in \{1, 2\}, 1 \leq l \leq m_v$$
$$b_j^v(l) = Pr[v = v_l | s = S_j]$$
$$b_j^v(l) \geq 0$$
$$\sum_l b_j^v(l) = 1$$

where:
$B^v$ is the voltage emission matrix; and
$b_j^v(l)$ is the probability of emitting voltage value $v_1$ from system state $s_j$.

Similarly, an emission matrix for frequency observations includes the following:

$$B^f = \{b_j^f(l)\} \forall j \in \{1, 2\}, 1 \leq l \leq m_f$$
$$b_j^f(l) = Pr[f = f_l | s = S_j]$$
$$b_j^f(l) \geq 0$$
$$\sum_l b_j^f(l) = 1$$

Also, an initial state probability matrix can include the following:

$$\pi = \{\pi_i\} \forall j \in \{1, 2\}$$
$$\pi_i = Pr[s(1) = S_i]$$
$$\pi_i \geq 0$$
$$\sum_i \pi_i = 1$$

where $\{\pi_i\}$ represents the probability of system in being state i in the beginning.

The above parameters of the HMM model, in accordance with at least one embodiment of the invention, are estimated in a training phase using the forward procedure, such as described, for example, in Baum et al., "A maximization technique occurring in the statistical analysis of probabilistic functions of Markov chains," The Annals of Mathematical Statistics 41, 1(1970), 164-171, the contents of which are incorporated by reference herein. In the training phase, the user indicates to the DC picogrid controller when an outage occurs. Estimates of the transition probabilities can also be determined using historical outage data.

Accordingly, at least one embodiment of the invention includes the following sequence of steps: identifying a reasonable transition matrix and random emission matrices; collecting frequency and voltage samples; use the above-noted Baum-Welch procedure to re-estimate transition matrix and emission matrices; using the Viterbi algorithm to identify the most probable state for each voltage and frequency sample; combining the outputs of HMMs using logical AND for final inference; and returning to the above-noted step of using the Baum-Welch procedure to re-estimate transition matrix and emission matrices.

Figure 2:
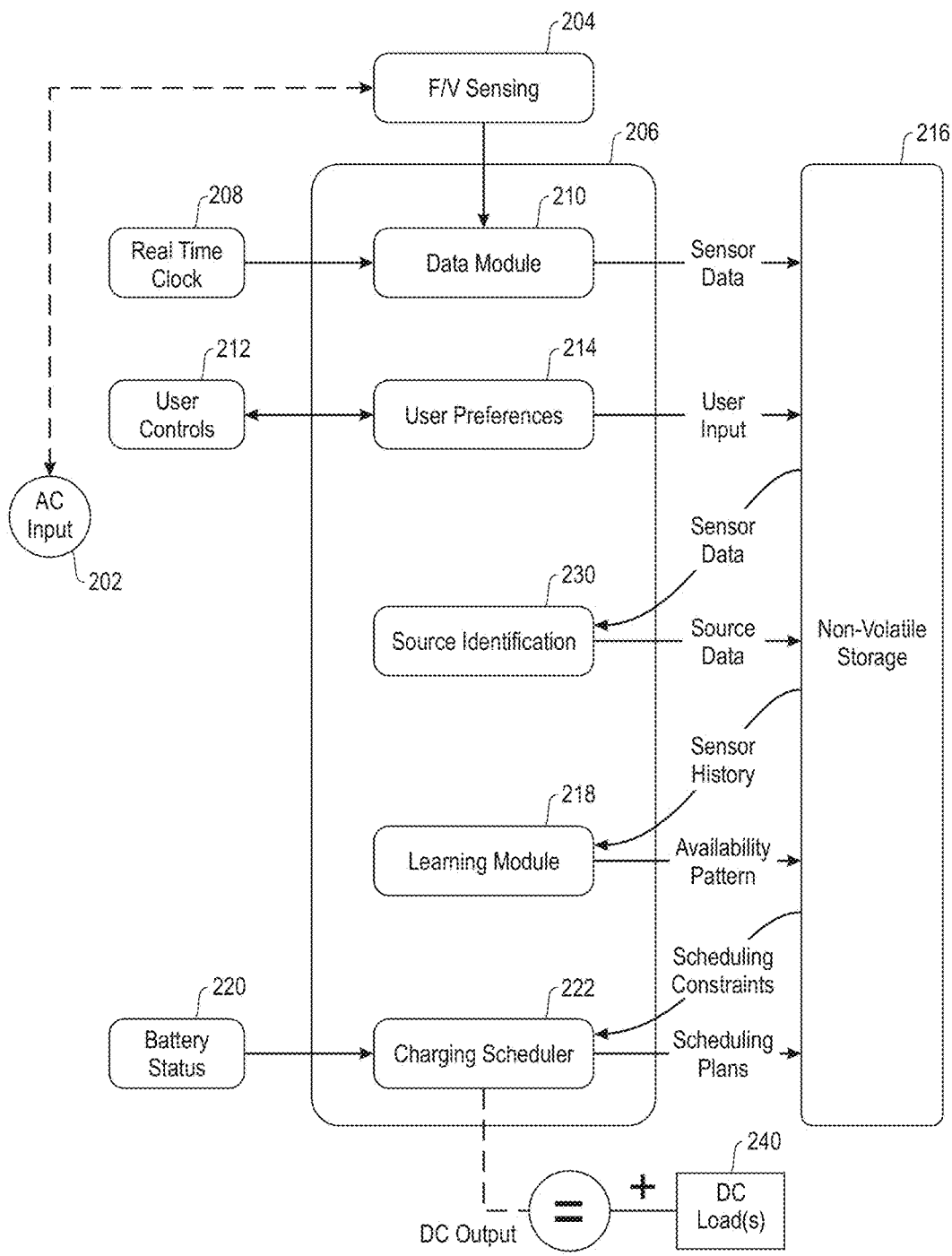
FIG. 2 is a diagram illustrating an example embodiment of the invention.

FIG. 2 is a diagram illustrating an example embodiment of the invention. By way of illustration, FIG. 2 depicts an AC power input source and/or supply 202, a frequency and/or voltage sensing component 204, a management module 206, and a non-volatile storage component 216. The management module 206 includes a data module 210, which receives input from a real-time clock component 208 and provides sensor data (obtained from the frequency and/or voltage sensing component 204) to the storage component 216. Additionally, the management module 206 includes a user preferences component 214, which receives input from one or more user controls 212 and provides such user input to the storage component 216.

The management module 206 also includes a source identification module 230, which receives sensor data from the storage component 216 and returns source data to the storage component 216. Further, the management module 206 includes a learning module 218, which exchanges sensor history information and availability patterns with the storage component 216. Sensor history includes, for example, raw voltage and frequency values observed in the past. The learning module 218 uses statistical machine learning techniques to learn availability patterns from the sensor data.

Also, the management module 206 includes a charging scheduler component 222, which receives battery status information from a battery status component 220 and also receives scheduling constraints from the storage component 216. Further, the charging scheduler component 222 provides scheduling plans to the storage component 216. The scheduler component 222 can determine scheduling plans using a rule based technology wherein rules can be specified by the user or can be pre-configured. The scheduler component 222 can also run an optimization model to reduce charging cost. Additionally, as depicted in FIG. 2, the scheduler component 222 provides DC output to a DC load(s) 240.

Figure 3:
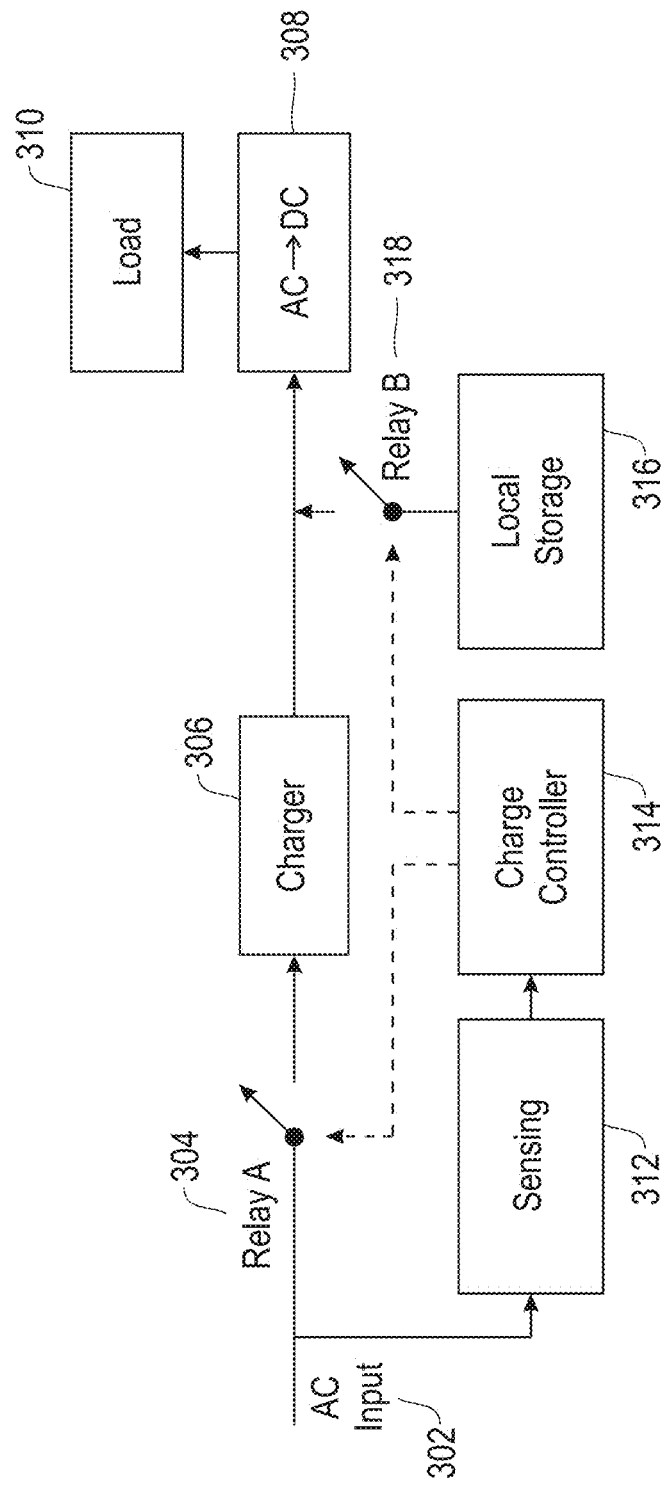
FIG. 3 is a diagram illustrating an example embodiment of the invention.

FIG. 3 is a diagram illustrating an example embodiment of the invention. By way of illustration, FIG. 3 depicts an AC power input 302, a sensing component 312, a charging controller component 314, a charger component 306, a local storage component 316, an AC to DC conversion component 308, and a DC load/appliance 310. Additionally, FIG. 3 depicts relay A 304 and relay B 318. Also, at least one embodiment of the invention includes, in addition to AC to DC conversion component 308, a DC reconditioning component because, in some instances, the DC power supplied by the source may have to be reconditioned before it is provided to the load.

After the AC power source has been sensed by the sensing component 312, the charge controller component 314 acts as a coordinator between the AC power source 302, the local storage component 316, and the connected DC load/appliance 310. Based on the identified AC power source, the charge controller component 314 toggles the input power source for the connected load 310 between the AC supply input 302 and the local/internal storage unit 316, and controls discharging and charging of the local storage component 316. The communication between the controller 314 and the additional illustrated components is implicit through the two relays (relay 304 and relay 318), and there is no direct link therebetween.

Additionally, in at least one embodiment of the invention, the charge controller component 314 may take device-aware actions during an outage to reduce power demand of the device. Such device-aware actions might include, for instance, reducing screen brightness of a laptop and/or television, or reducing intensity of a light emitting diode (LED) light.

In connection with the example embodiment depicted in FIG. 3, grid availability, battery state and local supply collectively decide the state of the relays, and hence, power source for the connected load, as detailed in the following table:

| AC Source | Battery Charged? | Relay A | Relay B |
|---|---|---|---|
| Grid | No | Yes | Yes |
| Grid | Yes | Yes | Yes/No |
| Inverter | No | Yes | No |
| Inverter | Yes | No | Yes |
| None | No | No Energy | |
| None | Yes | Yes/No | Yes |

In at least one embodiment of the invention, the picogrid controller can be programmed and/or configured to choose to use a grid power whenever available to serve the load and to maintain the local energy storage at approximately full capacity. Accordingly, if the power source switches to the AC UPS during an outage, the picogrid controller can serve the DC load from the local energy store. When local storage is depleted, the picogrid controller can draw power from the AC UPS, and, in at least one embodiment of the invention, the picogrid controller would start recharging the battery when grid power is available.

Additionally, in at least one embodiment of the invention, battery charging can be optimized based on multiple parameters such as, for example, grid outages patterns, demand prediction, static policies, dynamic policies, user preferences, and time of use pricing. The controller can learn usage patterns of an appliance, perform outage prediction to anticipate an outage, and take user input as well as time of usage pricing into consideration when scheduling battery charging.

Figure 4:
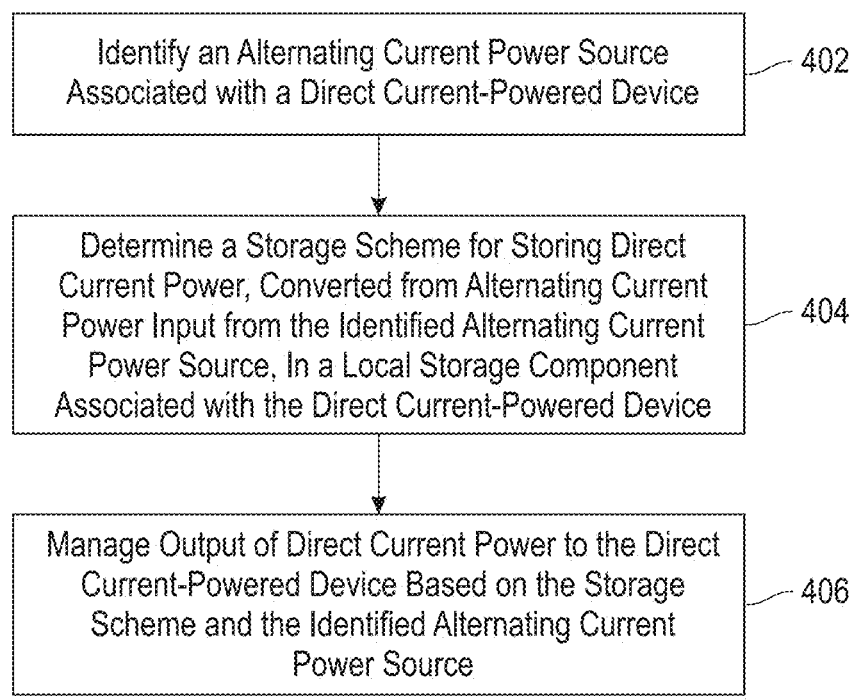
FIG. 4 is a flow diagram illustrating techniques according to an embodiment of the invention.

FIG. 4 is a flow diagram illustrating techniques according to an embodiment of the present invention. Step 402 includes identifying an alternating current power source associated with a direct current-powered device (for example, in real-time). The identifying step can include measuring a power supply frequency of an alternating current power source at the direct current-powered device level and/or measuring a power supply voltage magnitude of an alternating current power source at the direct current-powered device level. Additionally, as described herein, the alternating current power source can include, for example, a power grid, a generator and/or an inverter.

Step 404 includes determining a storage scheme for storing direct current power, converted from alternating current power input from the identified alternating current power source, in a local storage component associated with the direct current-powered device. Determining a storage scheme can include, for example, identifying one or more user preferences, determining a minimum charging threshold to be maintained at the local storage component associated with the direct current-powered device, as well as determining one or more power availability patterns associated with the identified alternating current power source. Determining power availability patterns can include determining a timing pattern of power outages associated with the identified alternating current power source.

Additionally, determining a storage scheme can also include determining power demand patterns associated with the direct current-powered device, and determining a time of use pricing scheme associated with the identified alternating current power source.

Step 406 includes managing output of direct current power to the direct current-powered device based on the storage scheme and the identified alternating current power source. The managing step can include managing output of direct current power to the direct current-powered device to reduce load on the identified alternating current power source, as well as to increase availability of the direct current-powered device for a user.

The techniques depicted in FIG. 4 can additionally include dynamically determining one or more operating parameters of the direct current-powered device based on the identified alternating current power source. As detailed herein, because the picogrid controller is co-located with a given direct current- or alternating current-powered device, the picogrid controller can be integrated into the device itself and hence have the ability to change operational parameters based on the identified alternating current power supply. By way of example, for DC powered devices, at least one embodiment of the invention can include reducing conversion losses by having local storage and controlling the storage scheme for the local storage. Additionally, for AC-powered devices, at least one embodiment of the invention can include implementing a change in an operational parameter such as, for example, turning device on or off, dimming lights incorporated with the device, etc.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor.

For example, at least one embodiment of the invention includes a module to measure a power supply frequency of an alternating current power source at a direct current-powered device level and/or a power supply voltage magnitude of an alternating current power source at the direct current-powered device level, as well as a module to identify an alternating current power source associated with the direct current-powered device based on said measured power supply frequency and/or power supply voltage magnitude. Additionally, such an embodiment also includes a module to schedule a battery charging scheme for storing direct current power, converted from alternating current power input from the identified alternating current power source, in a battery component associated with the direct current-powered device.

Further, such an embodiment includes a module to manage the output of direct current power, based on the schedule, to the direct current-powered device from the battery component and from direct current power converted from alternating current power input from the identified alternating current power source.

As detailed herein, at least one embodiment of the invention can also include identifying an alternating current power source associated with an alternating current-powered device. Such an embodiment additionally includes dynamically determining one or more operating parameters of the alternating current-powered device based on the identified alternating current power source, and managing output of alternating current power to the alternating current-powered device based on the determined one or more operating parameters of the alternating current-powered device and the identified alternating current power source.

Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 5:
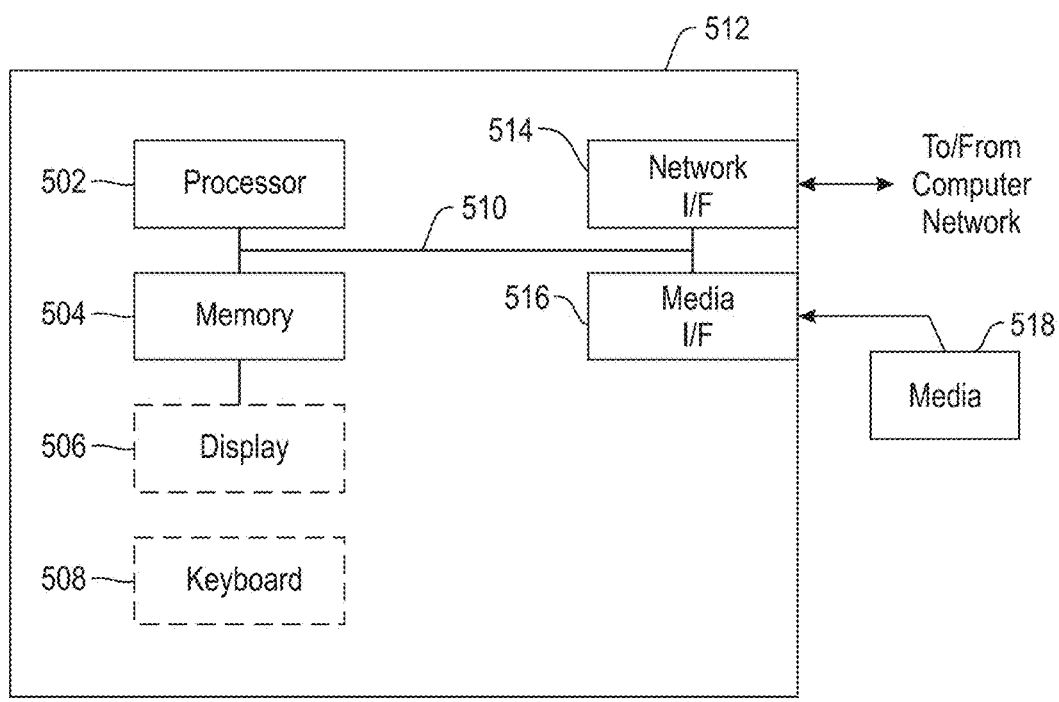
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer).

The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, charging a battery to minimize load on a local power source while respecting consumer preferences.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

measuring (i) a power supply frequency of an alternating current power source at a direct current-powered device level and (ii) a power supply voltage magnitude of the alternating current power source at the direct current-powered device level;

identifying one of multiple types of alternating current power sources attributed to the alternating current power source associated with the direct current-powered device based on (i) said measured power supply frequency at the direct current-powered device level and (ii) said measured power supply voltage magnitude at the direct current-powered device level, wherein said identifying comprises generating an inference of a state of the alternating current power source via $s(k)=\{S_0, S_1, \ldots, S_N\}$ $\forall k \in \{1 \ldots n\}$, wherein time (t) is discretized in $\Delta$ increments within a temporal sequence such that $t=\Delta k$, wherein N is the number of states (S), n is the temporal sequence length, and wherein related measurements related to each of the states (S) include sensed frequency f(k) and voltage v(k), wherein the voltage measurements are discretized into $m_v$ equi-spaced bins between $v_{min}$ and $v_{max}$, and the frequency measurements are discretized into $m_f$ equi-spaced bins between $f_{min}$ and $f_{max}$;

determining one or more temporal power outage patterns associated with the identified type of alternating current power source by analyzing time series data pertaining to the identified type of alternating current power source;

determining a storage scheme for storing direct current power, converted from alternating current power input from the alternating current power source, in a local storage component localized at the direct current-powered device, wherein said determining the storage scheme is based on (i) one or more usage patterns attributed to the direct current-powered device and (ii) one or more anticipated power outages associated with the identified type of alternating current power source, anticipated based on the one or more determined temporal power outage patterns; and managing output of direct current power from the local storage component to the direct current-powered device based on the storage scheme and the identified type of alternating current power source, wherein said managing comprises toggling between (i) the alternating current power source and (ii) the direct current power from the local storage component;

wherein the steps are carried out by at least one computer device.

2. The method of claim 1, comprising:
dynamically determining one or more operating parameters of the direct current-powered device based on the identified type of alternating current power source.

3. The method of claim 1, wherein said identifying comprises identifying an alternating current power source associated with a direct current-powered device in real-time.

4. The method of claim 1, wherein said alternating current power source comprises a power grid.

5. The method of claim 1, wherein said alternating current power source comprises a generator and/or an inverter.

6. The method of claim 1, wherein said determining a storage scheme comprises identifying one or more user preferences.

7. The method of claim 1, wherein said determining a storage scheme comprises determining a minimum charging threshold to be maintained at the local storage component associated with the direct current-powered device.

8. The method of claim 1, wherein said determining a storage scheme comprises determining one or more power availability patterns associated with the identified type of alternating current power source.

9. The method of claim 1, wherein said determining a storage scheme comprises determining one or more power demand patterns associated with the direct current-powered device.

10. The method of claim 1, wherein said determining a storage scheme comprises determining a time of use pricing scheme associated with the identified type of alternating current power source.

11. The method of claim 1, wherein said managing comprises managing output of direct current power to the direct current-powered device to reduce load on the alternating current power source.

12. The method of claim 1, wherein said managing comprises managing output of direct current power to the direct current-powered device to increase availability of the direct current-powered device for a user.

13. An article of manufacture comprising a non-transitory computer readable storage medium having computer readable instructions tangibly embodied thereon which, when implemented, cause a computer to carry out a plurality of method steps comprising:
measuring (i) a power supply frequency of an alternating current power source at a direct current-powered device level and (ii) a power supply voltage magnitude of the alternating current power source at the direct current-powered device level;
identifying one of multiple types of alternating current power sources attributed to the alternating current power source associated with the direct current-powered device based on (i) said measured power supply frequency at the direct current-powered device level and (ii) said measured power supply voltage magnitude at the direct current-powered device level, wherein said identifying comprises generating an inference of a state of the alternating current power source via $s(k)=\{S_0, S_1, \ldots, S_N\}$ $\forall k \in \{1 \ldots n\}$, wherein time (t) is discretized in $\Delta$ increments within a temporal sequence such that $t=\Delta k$, wherein N is the number of states (S), n is the temporal sequence length, and wherein related measurements related to each of the states (S) include sensed frequency f(k) and voltage v(k), wherein the voltage measurements are discretized into $m_v$ equi-spaced bins between $v_{min}$ and $v_{max}$, and the frequency measurements are discretized into $m_f$ equi-spaced bins between $f_{min}$ and $f_{max}$;
determining one or more temporal power outage patterns associated with the identified type of alternating current power source by analyzing time series data pertaining to the identified type of alternating current power source;
determining a storage scheme for storing direct current power, converted from alternating current power input from the alternating current power source, in a local storage component localized at the direct current-powered device, wherein said determining the storage scheme is based on (i) one or more usage patterns attributed to the direct current-powered device and (ii) one or more anticipated power outages associated with the identified type of alternating current power source, anticipated based on the one or more determined temporal power outage patterns; and
managing output of direct current power from the local storage component to the direct current-powered device based on the storage scheme and the identified type of alternating current power source, wherein said managing comprises toggling between (i) the alternating current power source and (ii) the direct current power from the local storage component.

14. A system comprising:
a memory; and
at least one processor coupled to the memory and configured for:
measuring (i) a power supply frequency of an alternating current power source at a direct current-powered device level and (ii) a power supply voltage magnitude of the alternating current power source at the direct current-powered device level;
identifying one of multiple types of alternating current power sources attributed to the alternating current power source associated with the direct current-powered device based on (i) said measured power supply frequency at the direct current-powered device level and (ii) said measured power supply voltage magnitude at the direct current-powered device level, wherein said identifying comprises generating an inference of a state of the alternating current power source via $s(k)=\{S_0, S_1, \ldots, S_N\}$ $\forall k \in \{1 \ldots n\}$, wherein time (t) is discretized in $\Delta$ increments within a temporal sequence such that $t=\Delta k$, wherein N is the number of states (S), n is the temporal sequence length, and wherein related measurements related to each of the states (S) include sensed frequency f(k) and voltage v(k), wherein the voltage measurements are discretized into $m_v$ equi-spaced bins between $v_{min}$ and $v_{max}$, and the frequency measurements are discretized into $m_f$ equi-spaced bins between $f_{min}$ and $f_{max}$;
determining one or more temporal power outage patterns associated with the identified type of alternating current power source by analyzing time series data pertaining to the identified type of alternating current power source;
determining a storage scheme for storing direct current power, converted from alternating current power input from the alternating current power source, in a local storage component localized at the direct current-powered device, wherein said determining the storage scheme is based on (i) one or more usage patterns attributed to the direct current-powered device and (ii) one or more anticipated power outages associated with the identified type of alternating current power source, anticipated based on the one or more determined temporal power outage patterns; and managing output of direct current power from the local storage component to the direct current-powered device based on the storage scheme and the identified type of alternating current power source, wherein said managing comprises toggling between (i) the alternating current power source and (ii) the direct current power from the local storage component.

15. A system comprising:
a memory; and
at least one processor coupled to the memory and configured to:
    measure (i) a power supply frequency of an alternating current power source at a direct current-powered device level and (ii) a power supply voltage magnitude of the alternating current power source at the direct current-powered device level;
    identify one of multiple types of alternating current power sources attributed to the alternating current power source associated with the direct current-powered device based on (i) said measured power supply frequency at the direct current-powered device level and (ii) said measured power supply voltage magnitude at the direct current-powered device level, wherein said identifying comprises generating an inference of a state of the alternating current power source via $s(k)=\{S_0, S_1, \ldots, S_N\}$ $\forall k \in \{1 \ldots n\}$, wherein time (t) is discretized in $\Delta$ increments within a temporal sequence such that $t=\Delta k$, wherein N is the number of states (S), n is the temporal sequence length, and wherein related measurements related to each of the states (S) include sensed frequency $f(k)$ and voltage $v(k)$, wherein the voltage measurements are discretized into $m_v$ equi-spaced bins between $v_{min}$ and $v_{max}$, and the frequency measurements are discretized into $m_f$ equi-spaced bins between $f_{min}$ and $f_{max}$;
    determine one or more temporal power outage patterns associated with the identified type of alternating current power source by analyzing time series data pertaining to the identified type of alternating current power source;
    schedule a battery charging scheme for storing direct current power, converted from alternating current power input from the alternating current power source, in a battery component localized at the direct current-powered device, wherein said battery charging scheme is based on (i) one or more usage patterns attributed to the direct current-powered device and (ii) one or more anticipated power outages associated with the identified type of alternating current power source, anticipated based on the one or more determined temporal power outage patterns; and
    manage output of direct current power, based on the schedule, to the direct current-powered device from the battery component and from direct current power converted from alternating current power input from the alternating current power source, wherein said managing comprises toggling between (i) the alternating current power source and (ii) the direct current power from the battery component.

* * * * *